Figure 1:
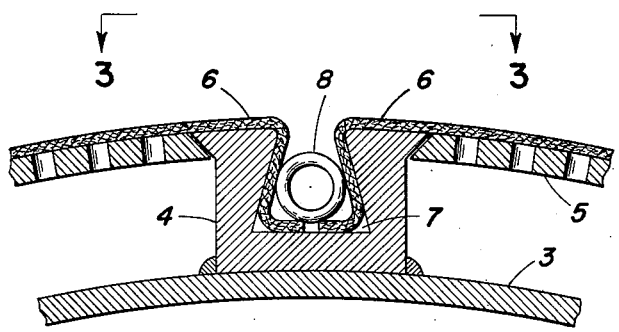

May 29, 1962 — W. P. DE BIE — 3,036,354

CLAMP

Filed April 29, 1960

INVENTOR.
Wilhelmus Petrus de Bie

BY *Philip Mintz*

ATTORNEY

United States Patent Office 3,036,354
Patented May 29, 1962

3,036,354
CLAMP
Wilhelmus Petrus de Bie, Blaricum, Netherlands, assignor to Dorr-Oliver Incorporated, Stamford, Conn., a corporation of Delaware
Filed Apr. 29, 1960, Ser. No. 25,741
1 Claim. (Cl. 24—243)

This invention relates to a clamp for securing flexible material to a base member. The clamp of this invention finds particular utility in securing filter fabric to the division strips of a rotary drum filter.

A rotary drum filter consists essentially of a pulp or a slurry tank within which is rotatably disposed a cylindrical drum formed on its outer surface with a plurality of adjacent independent filter cells defined by a plurality of spaced, longitudinally-extending, parallel division strips. The outer surfaces of the filter cells so formed are covered with a flexible filter medium which is secured to the drum.

One of the ways used in the past for securing the filter medium to the drum has been by means of a large spiral of wire extending around the circumference of the drum. This type of securement of the filter medium to the rotary drum is illustrated in Chemical Engineers' Handbook edited by John H. Perry, Second Edition, pages 1673 and 1674, published 1941 by McGraw-Hill Book Company, Inc.

This spiral wire winding has certain disadvantages. The wire winding operation for assembling such a filter is time consuming. The presence of the wire above the surface of the filter medium interferes with the use of scrapers preventing the cleaning of the filter surface down to the bare filter cloth. In order to replace a worn section of the filter cloth, or to work on a section of the filter support below the filter cloth, the entire filter cloth must be removed in addition to removal of the wire spiral.

In order to overcome these disadvantages, a panel type filter has been developed. In the panel type filter, the division strips are used for securing the filter medium to the rotary drum. In the past, this has been done by providing the division strips with grooves and then holding the filter fabric within these grooves by such means as lead caulking, rubber rope, or sash cord. These expedients overcame the disadvantages of the spiral wire wound rotary drum filters, but introduced new problems. These securement means did not always hold the cloth in place tightly and frequently worked loose during operation.

Accordingly, frequently, it was necessary to use a spiral wire winding to hold down these securement means used to retain the filter fabric within the grooves of the division strips. Of course, this wire winding caused the loss of many of the advantages the panel type filter had over the previous spiral wire wound filters.

In order to avoid the pulling loose of the caulking strips, it has been proposed to utilize rigid rods inserted into grooves in division strips. For this application, the groove is provided with a restricted throat, and a loop of the filter medium is pushed through the throat into the wider portion of the groove. A rigid rod is slid into the loop of filter medium axially of the rotary drum to lock the filter medium within the groove. This expedient likewise suffers from several disadvantages. A clear space adjacent the filter, equal in length to the axial length of the filter, is required for inserting these rigid rods. Additionally, the rigid rods do not prevent slippage of the filter medium within the groove in a circumferential direction with respect to the rotary drum, making it difficult to maintain proper uniform tension on the filter fabric. Also, installation and removal of such rods is cumbersome and time-consuming.

Accordingly, it is an object of this invention to provide a clamp for securing flexible sheet material to a base.

More specifically, it is an object of this invention to provide a clamp for securing the filter medium to the surface of a rotary drum filter, which clamp utilizes grooves in the division strip and which clamp will hold the fabric tightly and smoothly in place without any projections above the surface of the filter fabric, and which will not work loose in normal use but will be readily removable when desired.

In accordance with this invention, a new and improved clamp for securing flexible material is provided which comprises, in combination, a base member having a groove therein and a helical coil spring wedged within the groove to retain the flexible material therein.

Figures 2, 3:
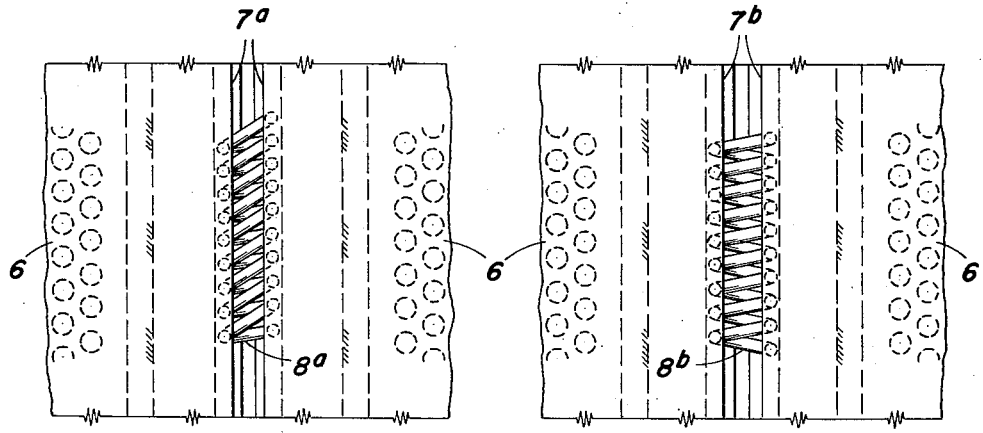
Figure 4:
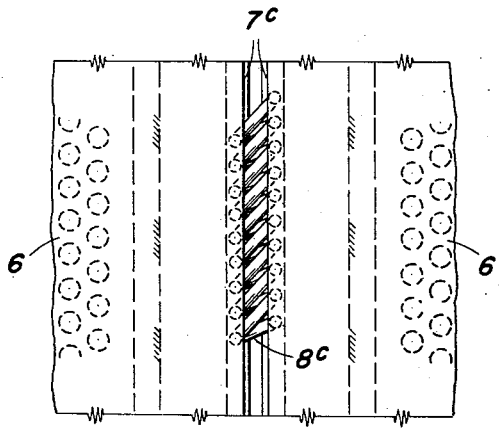

In order to provide a clearer understanding of the clamp of this invention, it will now be described in a particular embodiment as utilized on a rotary drum filter and as illustrated in the accompanying figures of the drawing in which:

FIGURE 1 is a fragmentary section of a rotary drum filter embodying the clamp of the present invention, and FIGURES 2, 3 and 4 are fragmentary plan views of portions of the rotary drum filter illustrated in FIGURE 1.

As illustrated in FIG. 1 there is shown the clamp of the present invention as embodied in a conventional rotary drum filter. The rotary drum filter includes a cylindrical drum 3 having mounted thereon a plurality of division strips 4 and a plurality of panels of filter media support 5. The plurality of division strips 4 serve to divide the surface of the drum into a plurality of drainage compartments. Filter media supports 5 are mounted between division strips 4 and in spaced relationship with respect to drum 3 so as to provide drainage space within the drainage compartments.

Each division strip 4 is provided with a groove 7 running the length of division strip 4. Groove 7 is configurated so as to have a restricted throat and a wider interior portion in the form of a cul-de-sac or as illustrated. Overlying filter media supports 5, filter media 6, 6 is provided and is held in place by inserting portions of the filter media 6, 6 into groove 7 for clamping. Within groove 7 there is provided clamping means 8 to hold filter media 6 in position and under tension.

In accordance with this invention, filter media clamping means 8 is in the form of a helical coil spring which is wedged into groove 7 through the restricted throat thereof. This coil spring 8 serves to press filter media 6 against the walls of groove 7 in division strip 4 and hold it there securely. Depending upon the materials to be filtered or the environment of use, helical coil spring 8 may be constructed of any appropriate resilient corrosion-resistant material.

Referring next to FIGURE 2, there is shown in plan view the appearance of helical coil spring 8 within groove 7 when properly dimensioned. It will be noted that helical coil spring 8a is deformed within groove 7a to somewhat steepen the helix angle.

If the groove is slightly oversize, as illustrated in FIG. 3, the deformation of the helix angle is less as illustrated by helical coil spring 8b in somewhat wider groove 7b.

As illustrated in FIG. 4, where the groove is somewhat narrower, helical coil spring 8c provides a somewhat steeper angle to accommodate itself to somewhat narrower grooves 7c.

It will be readily apparent that the helical coil spring can accommodate itself to a fair range of sizes of grooves without losing its ability to clamp filter media 6 within groove 7. It will be noted that, when coil spring 8 is positioned within groove 7, the spring 8 resiliently urges itself against the walls of groove 7 at a plurality of regions, thereby assuring stability of the securement. This is important because of variability in the width of these division strip grooves obtained during the manufacture thereof. Normally such variability in thickness is not great enough to nullify the ability of the helical coil spring to steepen its helix angle and hold filter media 6 properly in groove 7.

The deformation of the helical coil spring 8 by steepening the helix angle is very important in providing for satisfactory operation of this clamp. By the torsional deflection of the spring elements, the stresses and strains are disposed throughout an extended length of the spring, making large deformations readily possible without exceeding the elastic limits of the material of which the spring is composed. This makes possible the use of clamping members which can be compressed appreciably to permit insertion through restricted groove throats and which will re-expand to resiliently clamp flexible material against the wider spaced groove walls. Where bending deflection must be relied on, large deflections per unit length such as this are not possible without exceeding the elastic limit of the material, thereby destroying the spring action.

It will thus be seen that there has been provided a clamping means which is resiliently urged against the filter media at all time and which is provided with a very large number of contact points per unit length of division strip groove which provides for uniformity of the clamping action. Also, since the coil spring is a helix and has no sharp edges, the tendency to tear the cloth is minimized. Further, since such coil springs can readily be made and obtained under very closely dimensioned tolerances, reproduceable tensioning and clamping pressures can readily be obtained, not limited by variability in the clamping means.

While the subject invention has been described as embodied in a particular configuration and illustrated as adapted to a particular use, it is to be understood that the foregoing has been merely descriptive, the invention being limited solely as defined in the subjoined claim.

I claim:

A fastening arrangement in the form of a straight length of rail member having a longitudinal groove of dove-tailed cross-sectional configuration defined by converging side faces providing a constricted entrance area and by a substantially flat bottom face, with locking means securing flexible material in said groove, characterized thereby that said locking means is in the form of a helical spring having an outer diameter substantially greater than the width of said constricted entrance area with the flexible material placed in the groove, said spring adapted to be forced progressively through said constricted area into said groove incident to a localized flattening of the spring when being forced through said constricted area into the groove, and adapted to incompletely restore its normal shape when in the groove so as to exert interbalanced pressures in three outward directions, namely pressures normal to the respective converging sides and normal to said bottom of the groove, whereby the flexible material is clamped in place with additional wedging pressure effective between the spring and the converging walls when pull is exerted upon said material in a direction transversal of said groove.

References Cited in the file of this patent

UNITED STATES PATENTS

| 2,005,455 | Clark | June 18, 1935 |
| 2,055,251 | Duvall | Sept. 22, 1936 |
| 2,204,928 | Culver | June 18, 1940 |
| 2,311,326 | Birkin | Feb. 16, 1943 |
| 2,582,273 | Peterson et al. | Jan. 15, 1952 |